(12) United States Patent
Matsubara et al.

(10) Patent No.: US 9,616,506 B2
(45) Date of Patent: Apr. 11, 2017

(54) CUTTING INSERT AND FACE MILLING CUTTER USING THE SAME

(71) Applicant: SUMITOMO ELECTRIC HARDMETAL CORP., Itami-shi, Hyogo (JP)

(72) Inventors: Kouki Matsubara, Itami (JP); Atsuhiko Maeta, Itami (JP); Katsuya Nakakihara, Itami (JP)

(73) Assignee: SUMITOMO ELECTRIC HARDMETAL CORP., Itami-shi (JP)

( * ) Notice: Subject to any disclaimer, the term of this patent is extended or adjusted under 35 U.S.C. 154(b) by 213 days.

(21) Appl. No.: 14/409,832

(22) PCT Filed: Jan. 16, 2014

(86) PCT No.: PCT/JP2014/050623
§ 371 (c)(1),
(2) Date: Dec. 19, 2014

(87) PCT Pub. No.: WO2014/156225
PCT Pub. Date: Oct. 2, 2014

(65) Prior Publication Data
US 2015/0231711 A1 Aug. 20, 2015

(30) Foreign Application Priority Data

Mar. 26, 2013 (JP) ................................. 2013-063625

(51) Int. Cl.
*B23C 5/20* (2006.01)
*B23C 5/06* (2006.01)
*B23C 5/22* (2006.01)

(52) U.S. Cl.
CPC ............... *B23C 5/205* (2013.01); *B23C 5/06* (2013.01); *B23C 5/207* (2013.01); *B23C 5/2217* (2013.01);
(Continued)

(58) Field of Classification Search
CPC .. B23C 5/06; B23C 5/20; B23C 5/207; B23C 5/202; B23C 5/22; B23C 2200/367
See application file for complete search history.

(56) References Cited

U.S. PATENT DOCUMENTS 4,789,273 A * 12/1988 Wiacek ................. B23C 5/2213
407/34
6,227,772 B1 * 5/2001 Heinloth ................. B23C 5/202
407/113
(Continued)

FOREIGN PATENT DOCUMENTS

CN 101668606 A 3/2010
CN 102413976 A 4/2012
(Continued)

OTHER PUBLICATIONS

Mar. 1, 2016 Extended Search Report Issued in European Patent Application No. 14773878.5.
(Continued)

*Primary Examiner* — Sunil K Singh
*Assistant Examiner* — Ryan Rufo
(74) *Attorney, Agent, or Firm* — Oliff PLC

(57) ABSTRACT

An object is to provide a cutting insert for a milling cutter with which efficiency in machining can be increased. The cutting insert includes two polygonal main surfaces facing each other and side surfaces each connected to a corresponding side of each of the main surfaces. The side surfaces include a major side surface through which an attachment hole extends, a first minor side surface perpendicular to the major side surface, and a second minor side surface disposed between the first minor side surface and the major side surface. A ridge between each of the main surfaces and the major side surface forms a major cutting edge, and a ridge between each of the main surfaces and the second minor side
(Continued)

surface forms a minor cutting edge. An angle between the major cutting edge and the minor cutting edge is 145° or larger.

5 Claims, 7 Drawing Sheets

(52) U.S. Cl.
CPC .............. *B23C 5/2221* (2013.01); *B23C 5/20* (2013.01); *B23C 5/22* (2013.01); *B23C 2200/28* (2013.01); *B23C 2200/361* (2013.01); *Y10T 407/192* (2015.01); *Y10T 407/235* (2015.01)

(56) References Cited

U.S. PATENT DOCUMENTS

| | | | | |
|---|---|---|---|---|
| 6,238,146 B1 * | 5/2001 | Satran | ................. | B23B 27/1614 |
| | | | | 407/113 |
| 6,413,023 B1 * | 7/2002 | Nagashima | ........... | B23C 5/2221 |
| | | | | 407/113 |
| 7,306,409 B2 * | 12/2007 | Stabel | ................... | B23C 5/2213 |
| | | | | 407/113 |
| 7,547,164 B2 * | 6/2009 | Hessman | ................ | B23C 5/207 |
| | | | | 407/113 |
| 9,427,812 B2 * | 8/2016 | Gesell | ..................... | B23C 5/207 |
| 2003/0002929 A1 | 1/2003 | Nagashima | | |
| 2006/0056925 A1 * | 3/2006 | Hecht | .................. | B23D 77/044 |
| | | | | 407/37 |
| 2006/0165828 A1 * | 7/2006 | Smilovici | ................. | B22F 3/03 |
| | | | | 425/78 |
| 2006/0210364 A1 * | 9/2006 | Bellmann | ............... | B23C 5/109 |
| | | | | 407/40 |
| 2009/0155004 A1 | 6/2009 | Jansson | | |
| 2011/0129309 A1 | 6/2011 | Kovac et al. | | |
| 2011/0164932 A1 * | 7/2011 | Choi | ........................ | B23C 5/06 |
| | | | | 407/40 |
| 2012/0275868 A1 * | 11/2012 | Saito | ........................ | B23C 5/06 |
| | | | | 407/42 |
| 2014/0161545 A1 * | 6/2014 | Inagaki | ............... | B23B 27/1603 |
| | | | | 407/42 |

FOREIGN PATENT DOCUMENTS

| | | | | |
|---|---|---|---|---|
| CN | 102665983 A | | 9/2012 | |
| EP | 0 488 185 A1 | | 6/1992 | |
| JP | 2004 291205 A | | 10/2004 | |
| JP | A-2004-291205 | | 10/2004 | |
| JP | 2009-226510 A | * | 10/2009 | ............... B23C 5/06 |
| JP | A-2009-226510 | | 10/2009 | |
| JP | 2010 069578 A | | 4/2010 | |
| JP | 2010-094747 A | * | 4/2010 | ............... B23C 5/06 |
| JP | 2010-094748 A | * | 4/2010 | ............... B23C 5/06 |
| JP | A-2010-069578 | | 4/2010 | |
| JP | 4919298 B2 | | 4/2012 | |
| JP | A-2012-161907 | | 8/2012 | |
| WO | 2008/138414 A1 | | 11/2008 | |
| WO | 2010/147157 A1 | | 12/2010 | |
| WO | 2011/068691 A2 | | 6/2011 | |
| WO | WO 2011/068691 A2 | | 6/2011 | |
| WO | 2013/008565 A1 | | 1/2013 | |

OTHER PUBLICATIONS

Dec. 3, 2015 Office Action issued in Chinese Patent Application No. 201480001925.6.

Apr. 22, 2014 International Search Report issued in International Application No. PCT/JP2014/050623.

* cited by examiner

CUTTING INSERT AND FACE MILLING CUTTER USING THE SAME

TECHNICAL FIELD

The present invention relates to a cutting insert with which high-efficiency machining can be performed and that can be used for finish machining, and to a face milling cutter using the cutting insert.

BACKGROUND ART

For example, PTLs 1 and 2 describe known cutting inserts that are used for milling cutters.

The cutting inserts disclosed in these PTLs are of a so-called vertical-use type that uses a rectangular surface, which is usually called a side surface, as a rake face. By using the vertical-use type cutting inserts, high-feed high-efficiency machining can be performed because the cutting inserts each have a large thickness and a high rigidity in a direction in which the cutting insert receives a main component of a cutting force.

The cutting insert of PTL 2 has minor cutting edges that are formed by cutting out corners of a rectangular side surface, which serves as a rake face. A minor cutting edge is formed at each of the corners so that the minor cutting edge intersects a major cutting edge, which is a long side of the side surface, at an angle of approximately 45°. Thus, by attaching the cutting insert to a cutter body so that the major cutting edge forms an approach angle of 45°, the minor cutting edge is made to function as a flat cutting edge.

CITATION LIST

Patent Literature

PTL 1: Japanese Unexamined Patent Application Publication No. 2004-291205
PTL 2: Japanese Unexamined Patent Application Publication No. 2009-226510

SUMMARY OF INVENTION

Technical Problem

As described above, high-feed high-efficiency machining can be performed by using cutting inserts of a vertical-use type. However, as the feed rate increases, the thickness of a chip generated by the major cutting edge increases, and the cutting force increases. Therefore, it is difficult to further increase the feed rate, and the cutting inserts fail to meet the need to further increase the efficiency of machining.

When machining is performed by setting an approach angle, the surface roughness of a machined surface increases as the feed rate increases because of an adverse effect of the approach angle. The cutting insert described in PTL 2 has a minor cutting edge, which serves as a flat cutting edge, in order to offset the adverse effect. However, because the minor cutting edge has an angle of 45° with respect to the major cutting edge, the length of the minor cutting edge is limited.

Therefore, it is necessary to set the feed rate in such a range that a finishing effect of the minor cutting edge is not suppressed. This also makes it difficult to further increase the efficiency of machining.

An object of the present invention is to make it possible to further increase the efficiency of machining by improving the shape of a cutting insert.

Solution to Problem

To achieve the object, the present invention provides a cutting insert for a milling cutter, the cutting insert including two polygonal main surfaces facing each other and a plurality of side surfaces each connected to a corresponding side of each of the main surfaces, the main surfaces being used as rake faces and ridges where the main surfaces and the side surfaces intersect being used as cutting edges. The cutting insert is configured as follows.

The plurality of side surfaces include a major side surface through which an attachment hole extends, a first minor side surface perpendicular to the major side surface, and a second minor side surface disposed between the first minor side surface and the major side surface. A ridge where each of the main surfaces and the major side surface intersect forms a major cutting edge, and a ridge where each of the main surfaces and the second minor side surface intersect forms a minor cutting edge. An angle between the major cutting edge and the minor cutting edge is 145° or larger.

The cutting insert is attached to a cutter body in such a position that the minor cutting edge forms a flat cutting edge having a face angle of 5° or smaller and preferably in the range of 0' to 30'. In this state, the major cutting edge has an approach angle of 35° or smaller.

The present invention also provides a face milling cutter using the cutting insert according to the present invention, in which the cutting insert is attached to a support base at a periphery of an end of a cutter body in such a position.

Advantageous Effects of Invention

The thickness of a chip generated by a major cutting edge becomes smaller as the approach angle of the major cutting edge becomes smaller. The cutting insert according to the present invention has a minor cutting edge at each corner of a main surface, and an angle between the minor cutting edge and the major cutting edge is 145° or larger. Thus, when the cutting insert is in such a position that the minor cutting edge is used as a flat cutting edge, the major cutting edge has an approach angle of 35° or smaller.

Therefore, the thickness of a chip generated by the major cutting edge is smaller than that of a chip generated by existing face milling cutters having an approach angle of 45° or larger. As a result, a cutting force is reduced. Thus, limitations on setting the range of the feed rate are relaxed, and the machining efficiency is improved.

Moreover, by using the minor cutting edge, which is formed at a corner of the main surface, as a flat cutting edge, the surface roughness of a machined surface can be reduced. Accordingly, it is not necessary to perform finish machining, and therefore the machining efficiency can be further increased.

DESCRIPTION OF EMBODIMENTS

Figure 1:
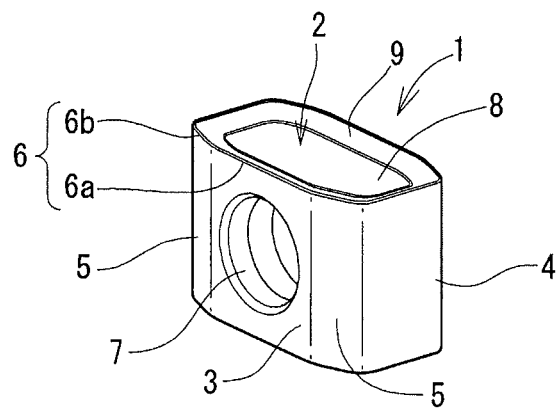
FIG. 1 is a perspective view illustrating an example of a cutting insert according to the present invention.
Figure 2:
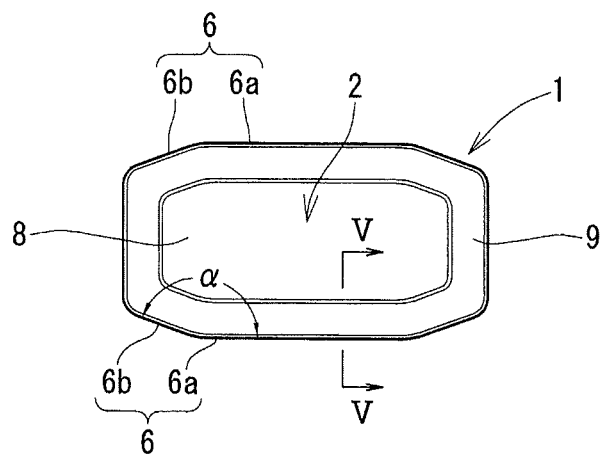
FIG. 2 illustrates a main surface of the cutting insert of FIG. 1.

Hereinafter, embodiments of a cutting insert according to the present invention and a milling cutter using the cutting insert will be described with reference to FIGS. 1 to 16.

FIGS. 1 to 5 illustrate an example of a cutting insert according to the present invention. A cutting insert 1 has two octagonal main surfaces 2 facing each other and a plurality of side surfaces each connected to a corresponding side of each of the main surfaces.

With the cutting insert 1 illustrated in the figures, each of the main surfaces 2 is used as a rake face, the side surfaces are used as flank faces, and ridges where the main surfaces 2 and the side surfaces intersect are used as cutting edges 6. Each of the cutting edges 6 includes a major cutting edge 6a and a minor cutting edge 6b.

The side surfaces include two major side surfaces 3 that face each other and through each of which an attachment hole 7 extends; first minor side surfaces 4 that are perpendicular to the two major side surfaces 3; and second minor side surfaces 5 that are disposed between the first minor side surfaces 4 and the major side surfaces 3. The ridges where the main surfaces 2 and the major side surfaces 3 intersect form the major cutting edges 6a.

The ridges where the main surfaces 2 and the second minor side surfaces 5 intersect form the minor cutting edges 6b. An angle α of 145° or larger is formed between each of the minor cutting edges 6b and a corresponding one of the major cutting edges 6a (α=145° for the cutting insert in the figures). Preferably, the length of each of the minor cutting edges 6b is 1 mm or larger. In this example, each of the minor cutting edges 6b has a length that is 1 mm or larger.

The length of the minor cutting edge 6b may differ depending on the size of the cutting insert, the angle of the cutting edge, and the size of cut. From an economical viewpoint in that a larger number of corners can be used, it is preferable that the length of the minor cutting edge 6b be smaller than or equal to half the width of the cutting insert in the longitudinal direction. As a standard size, it is preferable that the length of the minor cutting edge 6b be 1 mm or larger and 10 mm or smaller and it is more preferable that the length be 2 mm or larger and 5 mm or smaller.

In face milling, ridges where the main surfaces 2 and the first minor side surfaces 4 intersect are not used as cutting edges.

One of the major side surfaces 3 is used as a flank face, and the other major side surface 3 is used as a seating surface to be attached to a support base. In the present embodiment, the major side surfaces 3 each have an area larger than that of each of the main surfaces 2.

The cutting insert 1 of the example has a flat land 8, which is used as a seating surface, in a central portion of each of the main surfaces 2. The flat land 8 is recessed from the positions of the cutting edges 6, so that an inclined rake face 9 having a rake angle β (see FIG. 5) is provided between the cutting edges 6 and the flat land 8.

However, it is not necessary that the flat land 8 be recessed from the positions of the cutting edges and the inclined rake face 9 be provided. For applications in which the strength of a cutting edge is important, it may be advantageous if the main surfaces 2 intersect the side surfaces at an angle of 90° or larger.

Figure 3:
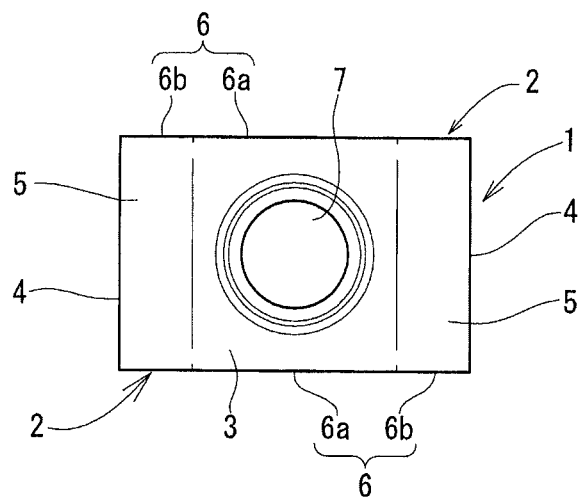
FIG. 3 illustrates a major side surface of the cutting insert of FIG. 1.
Figure 4:
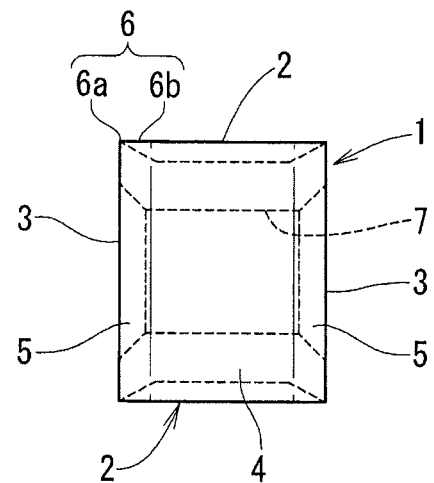
FIG. 4 illustrates a first minor side surface and second minor side surfaces of the cutting insert of FIG. 1.
Figure 5:
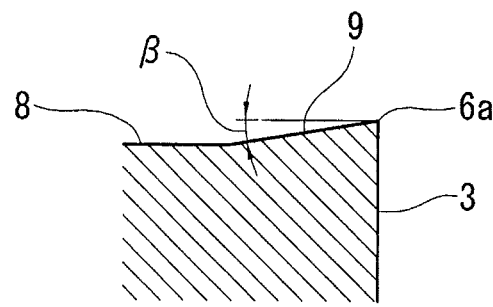
FIG. 5 is an enlarged sectional view taken along line V-V of FIG. 2.
Figure 6:
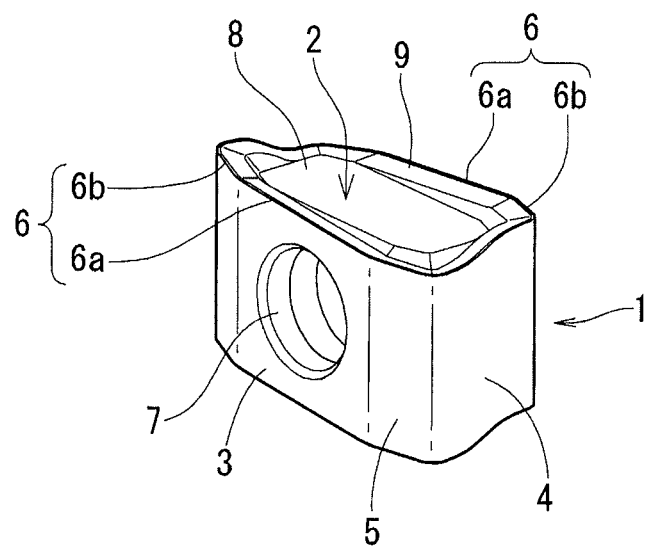
FIG. 6 is a perspective view illustrating another example of a cutting insert according to the present invention.
Figure 7:
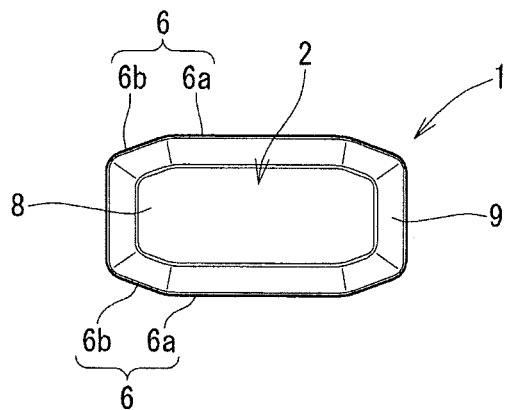
FIG. 7 illustrates a main surface of the cutting insert of FIG. 6.

It is not necessary, when seen in a direction perpendicular to the major side surface 3, that the major side surface 3 and the second minor side surface 5 connected to the major side surface 3 form a rectangular shape as illustrated in FIG. 3 nor is it necessary that the major cutting edge 6a be a linear edge.

Figure 8:
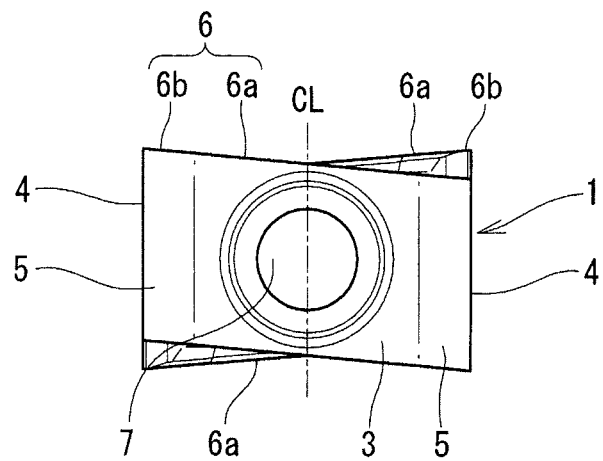
FIG. 8 illustrates a major side surface of the cutting insert of FIG. 6.
Figure 9:
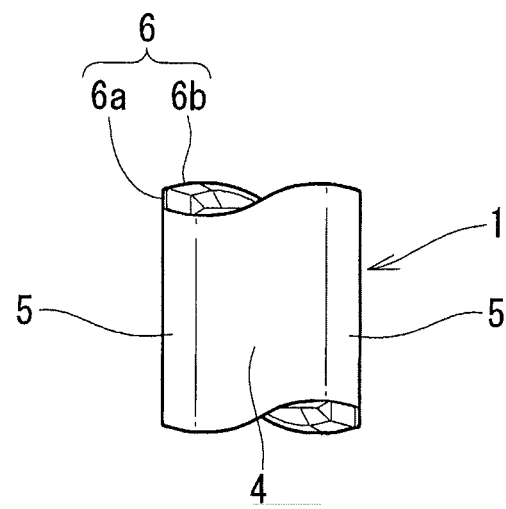
FIG. 9 illustrates a first minor side surface and second minor side surfaces of the cutting insert of FIG. 8.

FIGS. 6 to 9 illustrate a cutting insert 1 in which each of major side surfaces 3 and second minor side surfaces 5 connected to the major side surface 3 form a parallelogram as illustrated in FIG. 8, which is a view seen in a direction perpendicular to the major side surfaces 3.

In FIG. 8, the positions of acute-angled corners of a parallelogram on the front side and those of a parallelogram on the back side are opposite to each other, and the direction of inclination of a cutting edge 6 on the front side and that of a cutting edge 6 on the back side are opposite to each other.

Therefore, when the cutting insert 1 is rotated by 180° around the central line CL of one of the major side surfaces 3, the outline of the major side surface 3 on one side and the outline of the major side surface 3 on the other side overlap each other, so that a plurality of corners can be used.

If the shape of the cutting insert 1 is changed so that the parallelogram on the back side in FIG. 8 is disposed on the front side and the parallelogram on the front side is moved to the back side, a cutting insert 1 having a cutting edge extending in the opposite direction is obtained.

Figure 10:
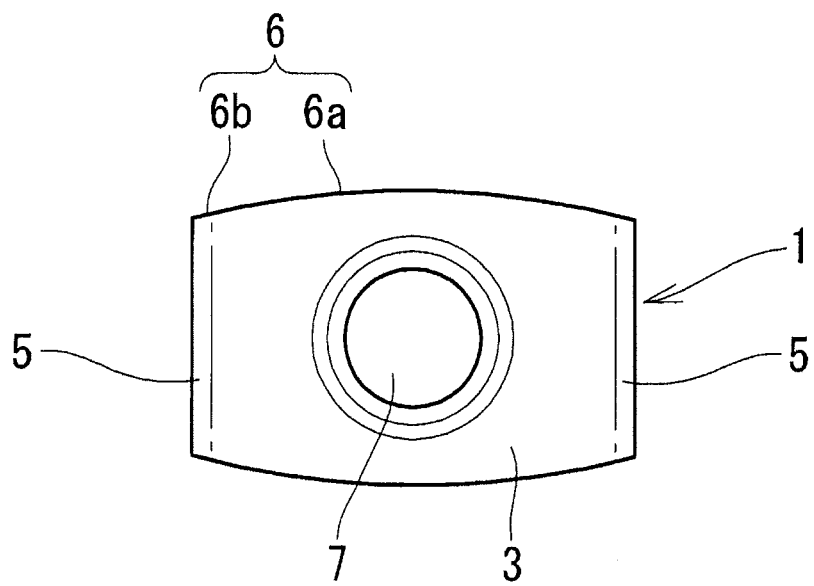
FIG. 10 illustrates still another example of a cutting insert according to the present invention.
Figure 11:
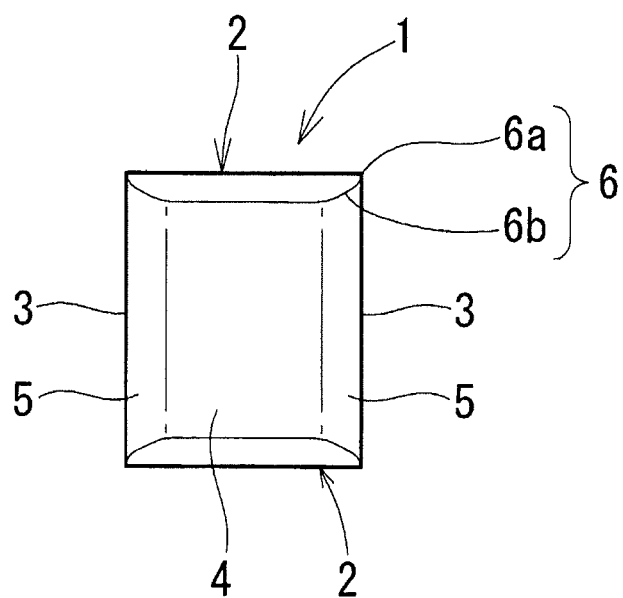
FIG. 11 illustrates a first minor side surface and second minor side surfaces of the cutting insert of FIG. 10.

FIGS. 10 and 11 illustrate a cutting insert 1 in which each of major side surfaces 3 and second minor side surfaces 5 connected to the major side surface 3 has a shape such that the distance between a pair of main surfaces 2 increases with increasing distance from both ends toward the center of the major side surface 3 and becomes maximum at the center as illustrated in FIG. 10, which is a view seen in a direction perpendicular to the major side surfaces 3. Therefore, a major cutting edge 6a has a convex arc shape.

Each of the cutting inserts 1 according to the present invention, which is configured as described above, is attached to a cutter body so as to have a predetermined face angle and a predetermined approach angle.

Figure 13:
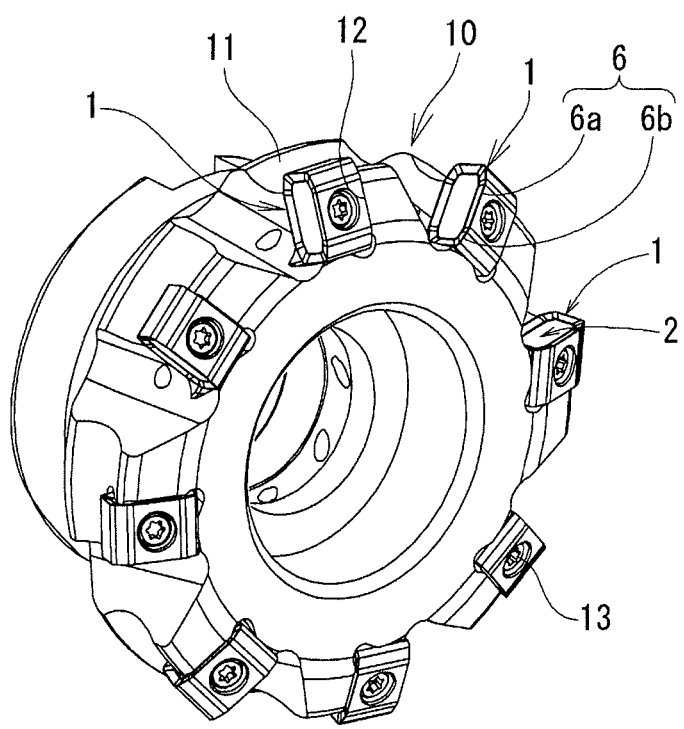
FIG. 13 is a perspective view of a milling cutter using the cutting insert of FIG. 1.
Figure 14:
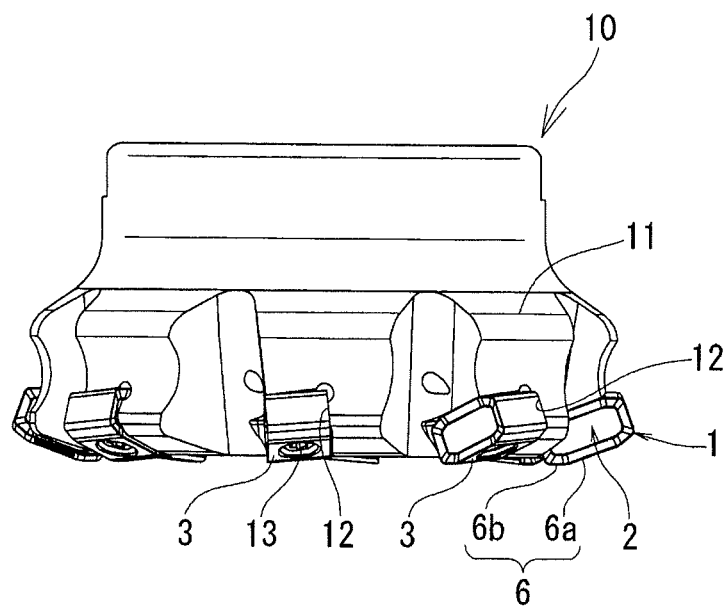
FIG. 14 is a side view of the milling cutter of FIG. 13.
Figure 15:
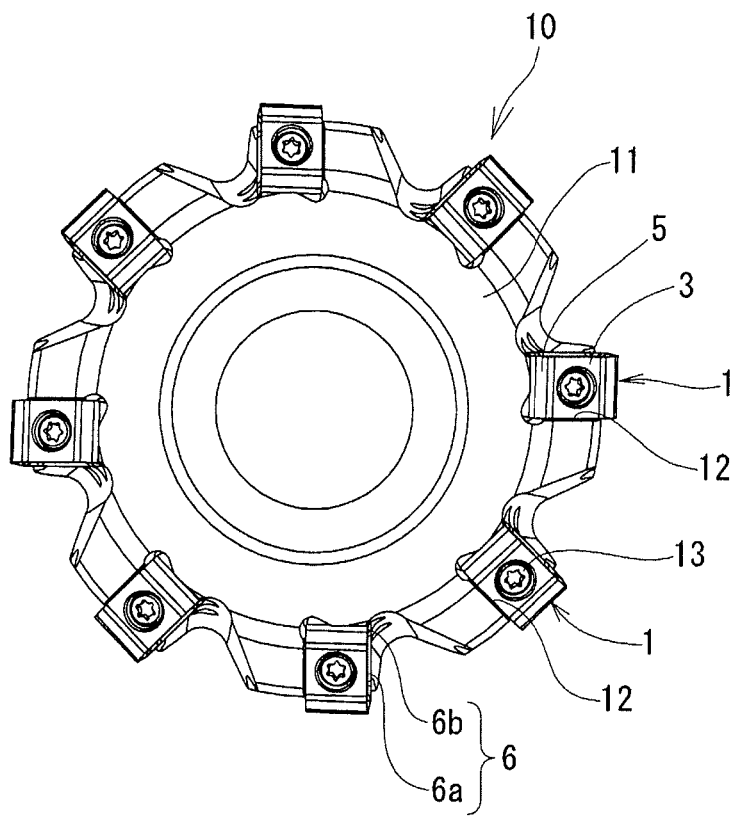
FIG. 15 is a front view of the milling cutter of FIG. 13.

FIGS. 13 to 15 illustrate an example of a face milling cutter using a cutting insert according to the present invention. In a face milling cutter 10 of the example, the major cutting edge 6a has a predetermined approach angle $\Psi$.

In the milling cutter 10 illustrated in the figures, the cutting inserts of FIG. 1 are seated on support bases 12, which are formed at a periphery of an end portion of a cutter body 11, and the cutting inserts 1 are fixed in place by using clamp bolts 13.

Figure 16:
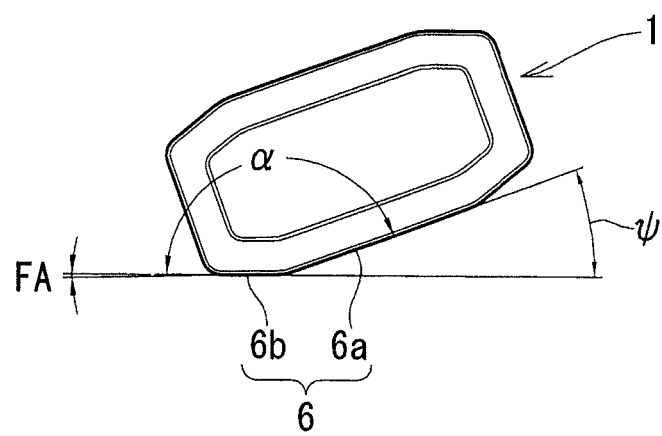
FIG. 16 illustrates an approach angle and a face angle of the milling cutter of FIG. 13.

As illustrated in FIG. 16, in the cutting insert 1, a minor cutting edge 6b has an appropriate face angle FA and the major cutting edge 6a has the predetermined approach angle Ψ.

The face angle FA of the minor cutting edge 6b is 5° or smaller and preferably in the range of about 0' to 30'. Because the angle α between the major cutting edge 6a and the minor cutting edge 6b is 145° in the cutting insert of FIG. 1, if the face angle FA is 30', the approach angle Ψ of the major cutting edge 6a is 34°30'.

Figure 12:
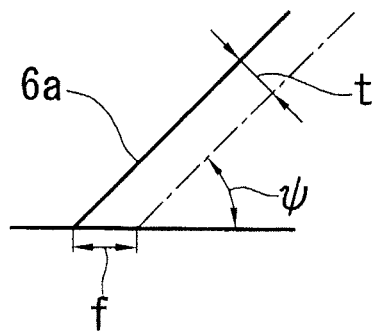
FIG. 12 illustrates how the thickness of a chip generated in face milling differs depending on an approach angle, in which the approach angle $\Psi$ in the lower figure is smaller than that in the upper figure.
Figure 12:
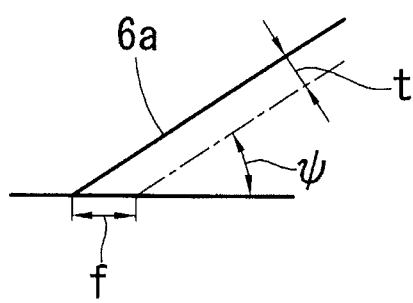

As illustrated in FIG. 12 in comparison, the thickness t of a chip generated by the major cutting edge 6a becomes smaller as the approach angle Ψ becomes smaller as long as the feed rate f is constant.

The milling cutter (face milling cutter) 10 using the cutting inserts according to the present invention has an approach angle Ψ that is 35° or smaller. Therefore, the thickness t of a chip generated by the milling cutter 10 is smaller than that a chip generated by existing milling cutters having an approach angle of 45°. As a result, a cutting force is reduced.

Thus, it is possible to make the feed rate higher than those of existing cutters, leading to improvement of machining efficiency.

Moreover, by setting the feed rate to be within the range of the length of the minor cutting edge 6b, the surface roughness of a machined surface can be reduced. Accordingly, it is not necessary to perform finish machining, and therefore the machining efficiency can be further increased.

Configurations of the embodiments of the present invention disclosed above are only exemplary and the scope of the present invention is not limited to the descriptions of the embodiments. The scope of the present invention is described in the claims and includes all modifications within the descriptions in the claims and the equivalents thereof.

REFERENCE SIGNS LIST

1 cutting insert
2 main surface
3 major side surface
4 first minor side surface
5 second minor side surface
6 cutting edge
6a major cutting edge
6b minor cutting edge
7 attachment hole
8 flat land
9 rake face
10 face milling cutter
11 cutter body
12 support base
13 clamp bolt
α angle between major cutting edge and minor cutting edge
β rake angle
FA face angle
Ψ approach angle
t thickness of chip
CL center line of major side surface

The invention claimed is:

1. A cutting insert for a milling cutter, the cutting insert comprising two polygonal main surfaces facing each other and a plurality of side surfaces each connected to a corresponding side of each of the main surfaces, the main surfaces being used as rake faces and ridges where the main surfaces and the side surfaces intersect being used as cutting edges, wherein the plurality of side surfaces include a major side surface through which an attachment hole extends, a first minor side surface perpendicular to the major side surface, and a second minor side surface disposed between the first minor side surface and the major side surface, wherein a ridge where each of the main surfaces and the major side surface intersect forms a major cutting edge, and a ridge where each of the main surfaces and the second minor side surface intersect forms a minor cutting edge, and wherein an angle between the major cutting edge and the minor cutting edge is 145° or larger, and wherein the major cutting edge has a convex arc shape in view from a direction perpendicular to the major side surface.

2. The cutting insert according to claim 1, wherein a length of the minor cutting edge is 1 mm or larger.

3. A face milling cutter comprising the cutting insert according to claim 1 attached to a support base that is disposed at a periphery of an end of a cutter body, wherein the sum of an approach angle and an angle between the major cutting edge and the minor cutting edge is less than 180°.

4. A face milling cutter comprising the cutting insert according to claim 2 attached to a support base that is disposed at a periphery of an end of a cutter body, wherein the sum of an approach angle and an angle between the major cutting edge and the minor cutting edge is less than 180°.

5. A cutting insert for a milling cutter, the cutting insert comprising:

two octagonal main surfaces facing each other; and
a plurality of side surfaces each connected to a corresponding side of each of the main surfaces,
wherein the plurality of side surfaces include a major side surface through which an attachment hole extends, a first minor side surface perpendicular to the major side surface, a second minor side surface disposed between the first minor side surface and the major side surface, and the major side surface and the second minor side surface form a parallelogram having two different angles in view from a direction perpendicular to the major side surface,
wherein a ridge where each of the main surfaces and the major side surface intersect forms a major cutting edge, and a ridge where each of the main surfaces and the second minor side surface intersect forms a minor cutting edge, and wherein an angle between the major cutting edge and the minor cutting edge is 145° or larger, and
wherein the major cutting edge and the minor cutting edge form a straight line when viewed in a direction perpendicular to the major side surface.

* * * * *